Nov. 17, 1936.  W. H. FISCHER  2,061,148
VAPORIZER
Filed July 16, 1935
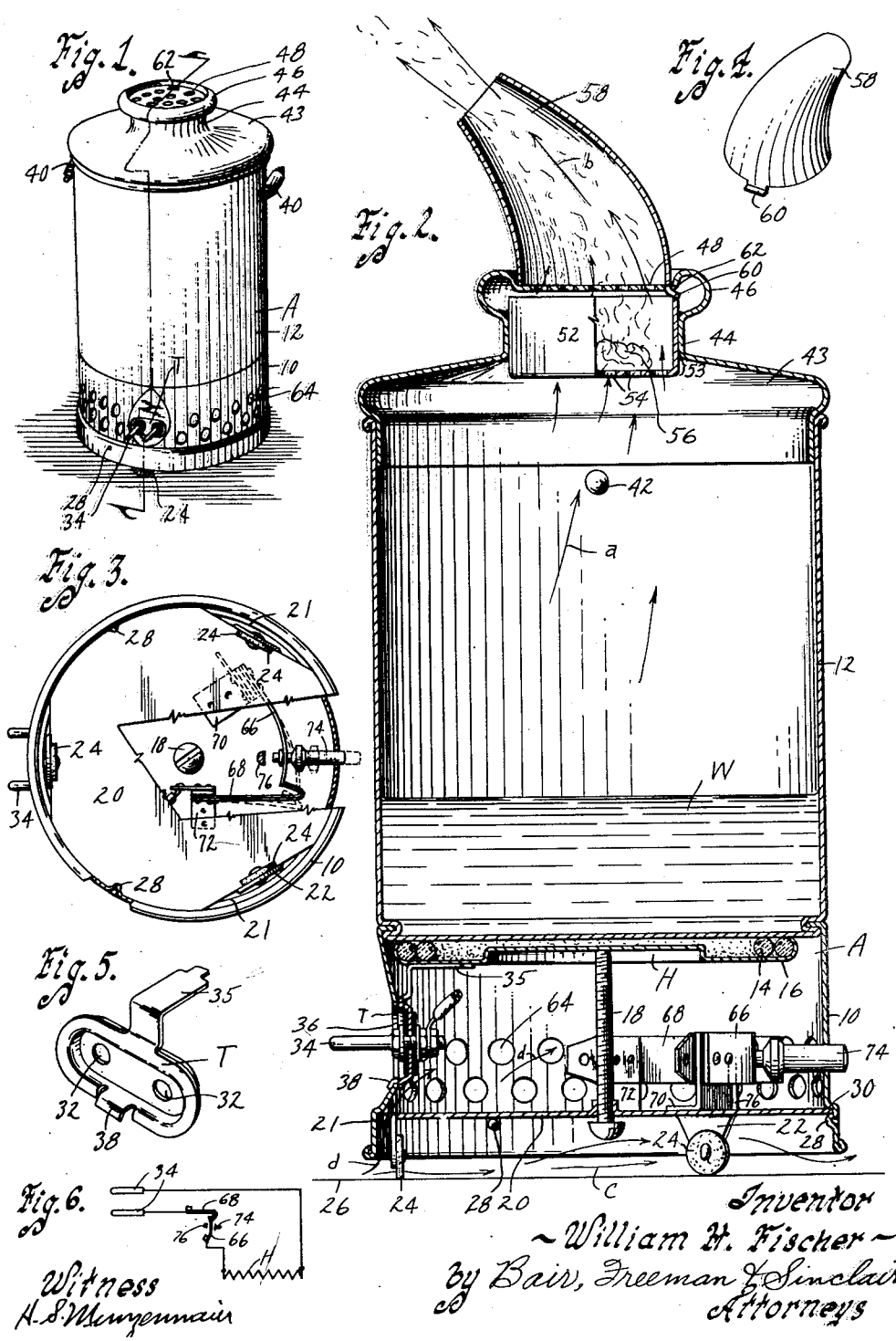
Inventor
~William H. Fischer~
By Bair, Freeman & Sinclair
Attorneys
Witness
H. S. Munyenmair Patented Nov. 17, 1936

2,061,148

UNITED STATES PATENT OFFICE 2,061,148

VAPORIZER

William H. Fischer, St. Louis, Mo., assignor to Knapp-Monarch Company, St. Louis, Mo., a corporation of Missouri Application July 16, 1935, Serial No. 31,604

16 Claims. (Cl. 219—38)

An object of my invention is to provide an electric apparatus especially designed for the purpose of vaporizing chemicals or the like, the apparatus being comparatively simple and inexpensive to manufacture.

A further object is to provide an appliance for evaporating chemicals by vaporizing water without submerging the chemicals in the water as in the ordinary manner.

A further object is to provide a vaporizer so designed that the chemical can be supported in an easily cleanable cup independent of the water to be vaporized, the cup being located in the path of flowing stream of water vapor and the bottom of the cup being perforated to permit passage of steam so that the chemical will be evaporated and carried by the steam from the vaporizer.

A further object is to provide a convenient arrangement for removably supporting the chemical containing cup in the vapor stream so that it can be readily removed and the chemical therein replenished.

Still another object is to provide on the appliance a directing spout so that the issuing vaporized chemical and steam can be directed laterally relative to the vaporizer.

Another object is to provide an appliance having a simple and effective means for supporting a heating element in position.

With these and other objects in view my invention consists in the construction, arrangement and combination of the various parts of my device, whereby the objects contemplated are attained, as hereinafter more fully set forth, pointed out in my claims and illustrated in the accompanying drawing, in which:

Figure 1 is a perspective view of a vaporizer embodying my invention.

Figure 2 is a vertical, sectional view on the line 2—2 of Figure 1 showing the vaporizer on an enlarged scale.

Figure 3 is a bottom plan view of the vaporizer.

Figure 4 is a perspective view of a discharge spout for the vaporizer.

Figure 5 is a perspective view of a terminal support used in the vaporizer; and

Figure 6 is an electro-diagrammatic view of the heating means and thermal cutout for it included in the construction of the vaporizer.

On the accompanying drawing I have used the reference character A to indicate generally a receptacle. The receptacle A has a cylindrical base part 10 and a water container part 12.

Within the base member 10 I provide a heating element A comprising an insulated resistance wire 14 and a casing 16. The casing 16 is held in position with the resistance element 14 against the bottom of the receptacle 12 by a set screw 18. It is threaded through a bottom plate 20.

The plate 20 is a circular disc as shown in Figure 3 with spaces cut back as indicated at 20 and legs 22 bent downwardly. Insulating washers 24 serve as feet on the legs 22 for contact with a floor or other supporting surface 26. Spaces 21 permit insertion of the plate 20 past projections 28 in the base member 10, whereafter the plate may be rotated to the position of Figure 3 and it will be retained by the projections against outward movement. It is limited against inward movement by a shoulder 30. After it is inserted in position and the set screw 18 is tightened, the plate and heating element are effectively retained in assembled position against any displacement.

The heating element casing 16 has a terminal support T mounted thereon comprising a stamping having a pair of perforations 32 through which terminal pins 34 for the resistance element 14 extend, the support having an extension 35 spot welded or otherwise secured to the casing 16. The support T is adapted to coact with the inner wall of the base 10 adjacent an opening 36 therein, a lip 38 being engageable with the bottom of the opening to retain the support against inward movement when a connector plug is pushed on to the terminal pins 34. The terminal pins are connected with the resistance wire 14 in the usual manner.

A pair of handles 40 are mounted by rivets or the like 42 on the receptacle 10 for convenience in handling the vaporizer. The receptacle 12 is provided with a removable lid 43 having a neck 44 terminating in an annular bead shaped handle 46 and a perforated top 48. The neck 44 is adapted to frictionally engage and support a chemical containing cup 52. The bottom of the cup 52 is provided with perforations 54 and is adapted to contain a medicant or chemical, such as tincture of benzoin or the like. Preferably a piece of cotton 56 is saturated with the chemical and then placed in the cup 52.

Surmounting the perforated top 48, I provide a spout 58. Its purpose is to direct the vapor in any desired lateral direction relative to the vaporizer. It is preferably removable and provided with a lip 60 to hook in a slotted perforation 62 of the perforated top 48.

When the water W in the receptacle 12 has been completely vaporized, there is danger of overheating and damaging the heating element H. I therefore provide a thermal cutout comprising contact springs 66 and 68. These are mounted on and insulated from brackets 70 and 72 respectively which are secured to the bottom plate 20 and project upwardly therefrom. The spring 68 is of bimetal so that upon its being heated to a predetermined temperature it will warp to the dotted line position in Figure 3, thus releasing the spring 66 and allowing it to assume its dotted position, thus breaking the circuit between the free ends of the springs 66 and 68. The springs, it will be noted by referring to Figure 6, are included in series circuit with the heating element H whereby energization thereof is discontinued when the thermal cutout trips.

Loosely connected with the spring 66 is a resetting button or pin 74 whereby the spring 66 can be pushed inwardly past the latch end of the bimetal spring 68 when it has cooled and warped to its original position shown in full lines in Figure 3.

The element 76 is a stop for limiting excessive movement of the button 76 inwardly. The thermal cutout is set so as to trip when the heating element H attains a temperature somewhat above the boiling point of the water so that after the water has boiled away and the heating element becomes excessively heated, it will be de-energized by the thermal cutout tripping, but the thermal cutout will not trip as long as water remains in the receptacle 12 and thereby keeps the temperature of the heating element sufficiently low.

*Practical operation*

Heretofore it has been customary to vaporize chemicals by merely placing them in water and boiling the water. This leaves an undesirable deposit on the sides of the pan in which the water has been boiled. This method is unsatisfactory as the more volatile portions of the chemical will be vaporized at first and thus an unequal distribution of the chemical in the issuing vapors from the boiling water in the pan is obtained.

I have provided an appliance in which the distribution is equal and the chemical is evaporated from the cup 52 without leaving any deposit in the water receptacle 12.

To operate the vaporizer, the lid 43 is removed and the cup 52 is removed from the lid by grasping the portion 53 thereof extending below the neck 44. Since it is merely a frictional fit, it can be readily pulled out of the lid and the chemical saturated cotton 56 inserted. Thereafter the cup can be inserted in the lid and the lid returned to the receptacle.

After sufficient energization of the heating element H the water indicated at W in the receptacle 12 will be vaporized and the vapor will flow upwardly as indicated by the arrow a passing through the perforations 54 and out of the perforated top 48 and the spout 58.

During the escape of the vapors they pass through and heat the contents of the cup 52 to vaporize the chemical and cause the vapors therefrom to flow with the steam out of the spout 58 as indicated by the arrow b. The perforations 54 permit passage of the steam in such manner as to vaporize the chemical in the most efficient manner.

The heating element construction and its association with the appliance as I have described it produces a simple and easily made and assembled heating means for the vaporizer. The particular construction employed also prevents any excessive transference of heat to the supporting surface 26 as air can circulate beneath the base 10 as indicated by the arrows c and then up through the spaces 21 as indicated by the arrows d and thereafter out through perforations 64 in the base 10.

Some changes may be made in the construction and arrangement of the parts of my device without departing from the real spirit and purpose of my invention and it is my intention to cover by my claims any modified forms of structure or use of mechanical equivalents, which may be reasonably included within their scope.

I claim as my invention:

1. In an appliance of the character described, a receptacle for water or the like, a sheet metal base therefor, an electric heating element therefor, a lid for said receptacle, an outlet, an opening in said lid, a chemical supporting cup within said receptacle adjacent said opening, a bottom plate for said receptacle, said base having a plurality of spaced instruck punch-mark projections to support said bottom plate and a set screw threaded in said bottom plate and engaged with said heating element to retain it against the bottom of said receptacle.

2. In an appliance of the character described, a receptacle, an electric heating means therefor comprising an insulated resistance wire, a casing therefor, a bottom plate for said receptacle and a set screw threaded in said bottom plate and engaged with said casing to retain said heating means against the bottom of said receptacle, said receptacle having a plurality of punch-mark projections, said plate having clearance spaces to permit said plate to be inserted past said projections and then turned to prevent outward movement of the plate relative to the receptacle when said set screw is tightened.

3. In an appliance of the character described, a receptacle, an electric heating means therefor comprising an insulated resistance wire, a casing therefor, a terminal support on said casing, terminal pins on said support, said receptacle having an opening through which said terminal pins extend, said terminal support having a lip engageable with a side of said opening to prevent inward movement of the terminal support relative to the receptacle and means for retaining said heating means against the bottom of said receptacle.

4. In an appliance of the character described, a receptacle, a sheet metal base therefor, an electric heating element therefor, a bottom plate for said receptacle, said base having a plurality of spaced instruck projections beneath the periphery of said bottom plate and a set screw threaded in said bottom plate and engaged with said heating element to retain it against the bottom of said receptacle.

5. In an appliance of the character described, a receptacle for water or the like, an electric heating means therefor, a lid for said receptacle, an outlet, an opening in said lid, a chemical supporting cup within said receptacle adjacent said opening, said heating means comprising an insulated resistance wire, a casing therefor, a bottom plate for said receptacle and a set screw threaded in said bottom plate and engaged with said casing to retain said heating means against the bottom of said receptacle, said receptacle having a plurality of projections, said plate having clearance spaces to permit said plate to be inserted past said projections and then turned to prevent outward movement of the plate relative to the receptacle when said set screw is tightened.

6. In an appliance of the character described, a receptacle for water or the like, an electric heating means therefor, a lid for said receptacle, an outlet, an opening in said lid, a chemical supporting cup within said receptacle adjacent said opening, said heating means comprising an insulated resistance wire, a casing therefor, a terminal support on said casing, terminal pins on said support, said receptacle having an opening through which said terminal pins extend, said terminal support having a lip engageable with a side of said opening to prevent inward movement of the terminal support relative to the receptacle and means for retaining said heating means against the bottom of said receptacle.

7. In an appliance of the character described, a receptacle, an electric heating element therefor, a bottom plate for said receptacle and a set screw threaded in said bottom plate and engaged with said heating element to retain it against the bottom of said receptacle, said receptacle having a plurality of punch-mark projections, said plate having clearance spaces to permit said plate to be inserted past said projections and then turned to prevent outward movement of the plate relative to the receptacle when said set screw is tightened.

8. In an appliance of the character described, a receptacle, an electric heating element therefor, a terminal support on said heating element, terminal pins extending from said support, said receptacle having an opening through which said terminal pins extend, said terminal support having a lip engageable with an edge of said opening to prevent inward movement of the terminal support relative to the receptacle and means for retaining said heating element against the bottom of said receptacle.

9. In an appliance of the character described, a receptacle, a sheet metal base therefor, an electric heating element therefor, a bottom plate for said receptacle, said base having a plurality of spaced, instruck, punch-mark projections beneath the periphery of said bottom plate, said bottom plate having a corresponding plurality of notches in its peripheral edge for by-passing said projections when inserting said bottom plate in said base, and a set screw threaded in said bottom plate and engaged with said heating element to retain it against the bottom of said receptacle.

10. In an appliance of the character described, a receptacle for water or the like, an electric heating element therefor, a lid for said receptacle, an outlet opening in said lid, a chemical supporting cup within said receptacle adjacent said opening, a bottom plate for said receptacle and a set screw threaded in said bottom plate and engaged with said heating element to retain it against the bottom of said receptacle, said receptacle having a plurality of projections, said plate having clearance spaces to permit said plate to be inserted past said projections and then turned to prevent outward movement of the plate relative to the receptacle when said set screw is tightened.

11. In a vaporizer, a container for volatizable liquid, means for volatizing liquid when therein, a lid for said container having a knob thereon, said knob having a depressed top wall, said wall being perforate, a cup for chemical within said knob below said top wall and a vapor directing spout mounted on said top wall and confined against lateral movement relative thereto by the portion of said knob surrounding said depressed top wall.

12. In an appliance of the character described, a receptacle for water or the like, an electric heating element therefor, a lid for said receptacle, an outlet opening in said lid, a chemical supporting cup within said receptacle adjacent said opening, a terminal support on said heating element, terminal pins carried thereby, said receptacle having an opening through which said terminal pins extend, said terminal support having a portion engageable with the edge of said opening to prevent inward movement of the terminal support relative to the receptacle and means for retaining said heating element against the bottom of said receptacle.

13. In a vaporizer, a container for volatizable liquid, means for volatizing liquid when therein, a lid for said container, said lid having a depressed portion, said depressed portion being perforate, an outlet located on said lid and communicating with said perforate portion for the volatized liquid and means in the path of flow of the volatized liquid for supporting chemical or the like to be evaporated and carried by the volatized liquid through said outlet, said outlet being inclined relative to the vertical axis of said container for directing the volatized liquid and evaporated chemical in a desired direction relative to said container and having a hook-like projection on the base thereof opposite the direction of inclination, said lid having an opening to receive said projection.

14. In a vaporizer, a container for volatizable liquid, a lid for said container having a knob thereon, said knob having a top wall, said wall being perforate, a cup for chemical or the like within said knob below said top wall, a heating element connected with said container having volatizable liquid therein to cause vapor therefrom to pass said cup, enter said knob and be discharged through said perforate top wall.

15. In a vaporizer, a container for volatizable liquid, means for vaporizing liquid in said container, a lid for said container, said lid having an upwardly extending neck serving as a knob for removing the lid from the container, the top of said knob being perforate for the escape of vapor and means for supporting chemical to be vaporized within said neck comprising a cup element inserted upwardly in the neck from the bottom of the lid when the lid is removed from the container, said cup element frictionally engaging the inner surface of said neck and being thereby normally retained in position permitting removal thereof for replacing chemical therein.

16. In a vaporizer, a container for volatizable liquid, means for vaporizing liquid in said container, a lid for said container, said lid having an upwardly extending neck terminating as a knob for removing the lid from the container, the top of said knob being perforate for the escape of vapor and means for supporting chemical to be vaporized within said neck comprising a cup element inserted upwardly into the neck from the bottom of the lid when the lid is removed from the container, said cup element having a perforate bottom to permit ready passage of vapor through the cup and its contents to be discharged from the perforate top of said knob.

WILLIAM H. FISCHER.